United States Patent [19]

Mulder et al.

[11] 3,885,042
[45] May 20, 1975

[54] BENZYLIDENESEMICARBAZIDE COMPOUNDS HAVING INSECTICIDAL ACTIVITY

[75] Inventors: Rudolf Mulder; Martin Jacob Handelé, both of Weesp, Netherlands

[73] Assignee: U.S. Philips Corporation, New York, N.Y.

[22] Filed: Feb. 6, 1973

[21] Appl. No.: 330,004

[30] Foreign Application Priority Data
Feb. 9, 1972 Netherlands............... 7201673

[52] U.S. Cl. ........................................ 424/323
[51] Int. Cl. ....................... A01n 9/12; A01n 9/20
[58] Field of Search........................ 424/322, 323

[56] References Cited
UNITED STATES PATENTS

| | | | |
|---|---|---|---|
| 3,274,115 | 9/1966 | Sydor................................ | 424/323 |
| 3,558,654 | 1/1971 | Bamford et al..................... | 424/323 |
| 3,712,914 | 1/1973 | Tilles.................................. | 260/479 C |

*Primary Examiner*—Albert T. Meyers
*Assistant Examiner*—D. W. Robinson
*Attorney, Agent, or Firm*—Frank R. Trifari; Norman N. Spain

[57] ABSTRACT

Insecticidal use of compounds of the formula

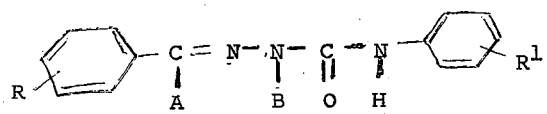

wherein R is a moiety selected from the group consisting of 3,4-dichloro and para-positioned substituents selected from the group consisting of hydrogen, chlorine, alkyl of 1 to 4 carbon atoms, alkoxy of 1 to 4 carbons and amino substituted with 1 to 2 alkyls of 1 to 4 carbons each, and A is a member selected from the group consisting of hydrogen, cyclopropyl, alkyl of 1 to 4 carbons, phenyl substituted alkyl of 1 to 4 carbons and halogen substituted alkyl of 1 to 4 carbons, B is a moiety selected from the group consisting of hydrogen and methyl, R' is a moiety selected from the group consisting of 3, 4 dichloro and para-positioned substituents selected from the group consisting of chlorine, alkyl of 1 to 4 carbons, alkoxy of 1 to 4 carbons, and amino containing 1 to 2 alkyls of 1 to 4 carbons.

10 Claims, No Drawings

BENZYLIDENESEMICARBAZIDE COMPOUNDS HAVING INSECTICIDAL ACTIVITY

It has been found that benzylidenesemicarbazide compounds which comply with the following formula have an insecticidal activity specifically with respect to beetles and larvae of beetles.

The relevant compounds have the formula

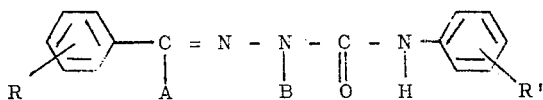

where
R is a substituent in the para-position which is selected from the group comprising a hydrogen atom, a chlorine atom, an alkyl group containing from 1 to 4 carbon atoms, an alkoxy group containing from 1 to 4 carbon atoms and an amino group substituted by 1 or 2 alkyl groups which each contain from 1 to 4 carbon atoms, or is a 3,4-dichloro group,
A is a hydrogen atom, a cyclopropyl group, an alkyl group which contains from 1 to 4 carbon atoms and may be substituted by halogen or a phenyl group,
B is a hydrogen atom or a methyl group, and
R' is a substituent in the para-position which is selected from the group comprising a chlorine atom, an alkyl group containing from 1 to 4 carbon atoms, an alkoxy group containing from 1 to 4 carbon atoms and an amino group substituted by 1 or 2 alkyl groups which each contain from 1 to 4 carbon atoms, or is a 3,4-dichloro group.

The insecticidal activity of these compounds was found in a biological evaluation investigation in which test solutions and test suspensions of the active substances were tested for biocidal activity which respect to, inter alia, *Leptinotarsa decemlineata*, both in the larval and in the adult stages, larvae of *Pieris brassicae*, *Aedes aegypti* and *Delia brassicae*.

The active substances were tested at different concentrations, starting from a maximum concentration of 100 mg of active substance per litre of test liquid, after which, depending upon the activity found, the concentration was reduced to successively 30, 10 and 3 mg of active substance per liter of test liquid.

The results of the evaluation investigation show that the active substances, both when ingested via the stomach and by contact action, have a satisfactory biocidal activity against beetles and larvae of beetles. Especially the larvae of beetles, more particularly those of the colorado beetle, are found to be sensitive to the active compounds in so high a degree that at concentrations of from 10 to 100 p.p.m. complete mortality ensues.

Surprisingly it was found that the active substances have a very particular insecticidal action mechanism. The substances were found to have not only a direct toxicity but also to affect the pattern of motion of insects so as to give rise to immobility of the insect or on the contrary to an increase in the intensity of motion. As a result, the insects can no longer maintain their position on plant leaves, so that they drop off and die, partly owing to dehydration.

The biological evaluation investigation further showed that in particular the compounds of the following formula have a satisfactory insecticidal activity:

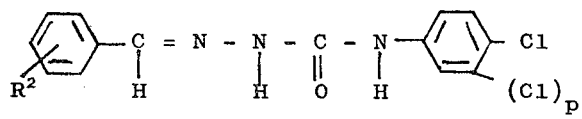

where
$R^2$ is a hydrogen atom of 4-chloro atom, a 4-alkyl group containing from 1 to 4 carbon atoms or a 3,4-dichloro group and p is 0 or 1.

Examples of active compounds according to the invention are:
1. 4-(4-chlorophenyl)-1-(4-chlorobenzylidene)-semicarbazide. Melting point 212°C.
2. 4-(4-chlorophenyl)-1-benzylidene-semicarbazide. Melting point 208°C.
3. 4-(4-chlorophenyl)-1-(3,4-dichlorobenzylidene)-semicarbazide. Melting point 235°C.
4. 4-(ethylphenyl)-1-(4-chlorobenzylidene)-semicarbazide. Melting point 164°C.
5. 4-(4-isopropylphenyl)-1-(4-chlorobenzylidene)-semicarbazide. Melting point 185°C.
6. 4-(4-isopropoxyphenyl)-1-(4-chlorobenzylidene)-semicarbazide. Melting point 166°C.
7. 4-(3,4-dichlorophenyl)-1-benzylidene-semicarbazide. Melting point 218°C.
8. 4-(3,4-dichlorophenyl)-1-(α-methylbenzylidene)-semicarbazide. Melting point 216°C.
9. 4-(4-chlorophenyl)-2-methyl-1-benzylidenesemicarbazide. Melting point 153°C.
10. 4-(4-chlorophenyl)-1-(α-methylbenzylidene)-semicarbazide. Melting point 220°C.
11. 4-(3,4-dichlorophenyl)-1-(4-chlorobenzylidene)-semicarbazide. Melting point 134°C.
12. 4-(4-chlorophenyl)-1-(α-methyl-4-chlorobenzylidene)-semicarbazide. Melting point 260°C.
13. 4-(3,4-dichlorophenyl)-1-(α-phenylbenzylidene)-semicarbazide. Melting point 179°C.
14. 4-(3,4-dichlorophenyl)-1-(4-isopropylbenzylidene)-semicarbazide. Melting point 172°C.
15. 4-(3,4-dichlorophenyl)-1-(α-methylbenzylidene)-semicarbazide. Melting point 204°C.
16. 4-(3,4-dichlorophenyl)-1-(4-methylbenzylidene)-semicarbazide. Melting point 191°C.
17. 4-(4-methylphenyl)-1-benzylidene-semicarbazide. Melting point 183°C.
18. 4-(4-methoxyphenyl)-1-benzylidene-semicarbazide. Melting point 193°C.
19. 4-(3,4-dichlorophenyl)-2-methyl-1-benzylidene-semicarbazide. Melting point 116°C.
20. 4-(3,4-dichlorophenyl)-2-methyl-1-(α-methylbenzylidene)-semicarbazide. Melting point 110°C.
21. 4-(3,4-dichlorophenyl)-2-methyl-1-(α-methyl-4-chlorobenzylidene)-semicarbazide. Melting point 159°C.
22. 4-(3,4-dichlorophenyl)-1-(α-methyl-3,4-dichlorobenzylidene-semicarbazide. Melting point 263°C.
23. 4-(3,4-dichlorophenyl)-2-methyl-1-(4-chlorobenzylidene)-semicarbazide. Melting point 149°C.
24. 4-(4-chlorophenyl)-2-methyl-1-(α-methylbenzylidene)-semicarbazide. Melting point 144°C.
25. 4-(4-chlorophenyl)-2-methyl-4-(4-chlorobenzylidene)-semicarbazide. Melting point 148°C.
26. 4-(4-chlorophenyl)-2-methyl-1-(α-methylbenzylidene)-semicarbazide. Melting point 224°C.

27. 4-(4-chlorophenyl)-2-methyl-1-(3,4-dichlorobenzylidene)-semicarbazide. Melting point 149°C.

28. 4-(3,4-dichlorophenyl)-1-(4-methoxybenzylidene)-semicarbazide. Melting point 200°C.

29. 4-(3,4-dichlorophenyl)-2-methyl-1-($\alpha$-ethylbenzylidene)-semicarbazide. Melting point 106°C.

30. 4-(3,4-dichlorophenyl)-2-methyl-1-(4-isopropylbenzylidene)-semicarbazide. Melting point 109°C.

31. 4-(3,4-dichlorophenyl)-2-methyl-1-(4-methylbenzylidene)-semicarbazide. Melting point 134°C.

32. 4-(4-methoxyphenyl)-1-benzylidene-semicarbazide. Melting point 165°C.

33. 4-(3,4-dichlorophenyl)-1-($\alpha$-trifluoromethylbenzylidene)-semicarbazide. Melting point 194°C.

34. 4-(4-t.butylphenyl)-1-(4-chlorobenzylidene)-semicarbazide. Melting point 242°C.

35. 4-(4-dimethylaminophenyl)-1-(4-chlorobenzylidene)-semicarbazide. Melting point 197°C.

36. 4-(3,4-dichlorophenyl)-2-methyl-1-($\alpha$-cyclopropyl-4-chlorobenzylidene)-semicarbazide. Melting point 163°C.

The compounds 1 to 5 of the above list have so high a level of activity that a concentration of about 10 p.p.m. is sufficient to obtain a satisfactory biocidal effect against larvae of the colorado beetle. The substance numbered 36 causes a 90 percent to 100 percent mortality of larvae of the yellow fever mosquito even when used in the very low concentration of 0.1 p.p.m.

Because of their biocidal activity the active substances may be used for controlling beetles or larvae of beetles which cause damage in agriculture and horticulture and in industrial products. The active substances may, for example, be used for controlling the colorado beetle, which is noxious in particular to potato cultures, and for controlling, for example, wood borers and capricorn beetles which are destructive to timber. It is also possible to protect the abovementioned objects against attack by beetles by means of the active substances.

For practical use the active compounds are worked up into preparations. In these preparations according to the invention the active substance is mixed with a solid carrier material or dissolved or dispersed in a liquid carrier material, as the case may be in combination with adjuvants, such as surfactants and stabilizers.

Examples of preparations according to the invention are aqueous solutions and dispersions, oil solutions and oil dispersions, pastes, dusts, wettable powders, miscible oils, invert emulsions, aerosol preparations and fumigating candles.

Wettable powders, pastes and miscible oils are preparations in concentrated form which are diluted with water before or during use.

The invert emulsions are mainly used in air application, large areas being treated with a comparatively small amount of a preparation. The invert emulsion may be prepared shortly before, or even during, the spraying operation in the spraying apparatus by emulsifying water in an oil solution or an oil dispersion of the active substance. Hereinafter some forms of preparation are described more fully by way of example.

Dusts are obtainable by intimately mixing the active substance with an inert solid carrier material, for example in a concentration of from 1 percent to 50 percent by weight. Examples of suitable solid carrier materials are talc, kaolin, pipe clay, diatomaceous earth, dolomite, gypsum, chalk, bentonite, attapulgite and colloidal $SiO_2$ or mixtures of these and similar substances. Also organic carrier materials such as, for example, ground walnut shells may be used.

Wettable powders are produced by mixing from 10 to 80 parts by weight of a solid inert carrier such, for example, as the aforementioned carrier materials with from 10 to 80 parts by weight of the active substance, from 1 to 5 parts by weight of a dispersing agent, such, for example, as the lignin sulfonates or alkylnaphthalene sufonates known for this purpose, and preferably also with from 0.5 to 5 parts by weight of a wetting agent, such as fatty alcohol sulfates, alkylaryl sulfonates or fatty acid condensation products, for example, those known under the trade name Igepon.

For the production of miscible oils the active compound is dissolved or finely divided in a suitable solvent which preferably is poorly miscible with water, after which an emulsifier is added. Suitable solvents are, for example, xylene, toluene, high-aromatic petroleum distillates, for example solvent naphtha, distilled tar oil and mixtures of these liquids. Examples of suitable emulsifiers are alkylphenoxypolyglycol ethers, polyoxyethylene sorbitanesters of fatty acids or polyoxyethylene sorbitolesters of fatty acids. The concentration of the active compound in these miscible oils is not restricted within narrow limits and may vary, for example, between 2 percent and 50 percent by weight. In addition to a miscible oil, a suitable liquid and highly concentrated primary concentration is a solution of the active substance in a liquid which is readily miscible with water, for example, acetone, to which solution a dispersing agent and possibly a wetting agent are added. Diluting such a concentrate with water shortly before or during the spraying operation provides an aqueous dispersion of the active substance.

An aerosol preparation aoording to the invention is obtained in the usual manner by incorporating the active substance, as the case may be in the form of a solution, in a volatile liquid suitable for use as a propellant such, for example, as the mixture of chlorine and fluorine derivatives of methane and ethane commercially available under the trade mark "Freon."

Fumigating candles or fumigating powders, i.e., preparations which when burning are capable of emitting a pesticidal smoke, are obtained by incorporating the active substance in a combustible mixture which may comprise a sugar or a wood, preferably in ground form, as a fuel, a substance to maintain combustion such, for example, as ammonium nitrate or potassium chlorate, and a substance to retard combustion, for example kaolin, bentonit and/or colloidal silicic acid.

In addition to the aforementioned ingredients the preparations according to the invention may contain other substances which are known for use in such preparations.

For example, a lubricant, such as calcium stearate or magnesium stearate, may be added to a wettable powder. Furthermore, "sticking agents," such as polyvinylalcoholcellulose derivatives or other colloidal materials, such as casein, may be added to improve the adherence of the pesticide to the surface to be protected.

The preparations according to the invention may also contain known pesticidal compounds. This may widen the spectrum of activity of the preparation and may give rise to synergism.

The following known insecticidal, fungicidal or acaricidal compounds are suitable for use in such a combination preparation.

Insecticides such as:
1. clorinated hydrocarbons, for example 2,2-bis(p-chlorophenyl)-1,1,1-trichloroethane and hexachloroepoxy-octahydrodimethanonaphthalene;
2. carbamates, for example N-methyl-1-natphtylcarbamate;
3. dinitrophenols, for example 2-methyl-4,6-dinitrophenol and 2-(2-butyl)-4,6-dinitrophenyl-3,3-dimethylacrylate;
4. organic phosphorus compounds, such as dimethyl-2-methoxy-carbonyl-1-methylvinyl-phosphate; 0,0-diethyl-0-p.nitro-phenyl-phosphorustioate; N-monomethylamide of 0,0-dimethyl-dithiophosphorylacetic acid;

Acaricides such as:
5. diphenylsulfides, for example p-chlorobenzyl-p-chloro-phenyl sulfide and 2,4,4'-5-tetra-chlorodiphenylsulfide;
6. diphenylsulfonates, for example p-chlorophenylbenzenesulfonate;
7. methylcarbinols, for example, 4,4-dichloro-a-trichloro-methylbenzhydrol;
8. quinoxaline compounds, such as methylquinoxaline dithiocarbonate;

Fungicides such as:
9. organic mercury compounds, for example, phenylmercury acetate and methylmercury cyanoguanide;
10. organic tin compounds, for example, triphenyltin hydroxide and triphenyltin acetate;
11. alkylenebisdithiocarbamates, for example zincethylene-bisdithiocarbamate and manganese ethylenebisdithiocarbamate;
12. and further
 2,4-dinitro-6-(2-octyl-phenylcrotonate),
 1-[bis(dimethylamino)phosphoryl] -3-phenyl-5-amino-1,2,4-triazole,
 6-methyl-quinoxaline-2,3-dithiocarbonate,
 1,4-dithioanthraquinone-2,3-dicarbonitrile,
 N-trichloromethylthiophthalimide,
 N-trichloromethylthiotetrahydrophthalimide,
 N-(1,1,2,2-tetrachloroethylthio)-tetrahydrophthalimide,
 N-dichlorofluoromethylthio-N-phenyl-N'-dimethylsulfonyldiamide and tetrachloroisophthalonitrile.

The dosage of the preparations according to the invention which is suitable in practice will naturally depend upon various factors, such as the field of application, the active substance selected, the form of preparation, the nature and intensity of the infection.

For agricultural use a dosage which corresponds to from 1 to 10 kg of active substance per hectare will generally provide the desired effect.

The active benzylidene semicarbazide compounds described hereinbefore are novel substances, with the exception of the compounds 4-(4-chlorophenyl)-1-benzylidene-semicarbazide, 4-(4-methyl-phenyl)-1-benzylidene-semicarbazide and 4-(4-chlorophenyl)-1-(4-chlorobenzylidene)-semicarbazide. The latter three substances are described in Chemical Abstracts 58, 4569-4570 (1963). No biological activity of these substances is known.

The novel substances according to the invention can be represented by the formula

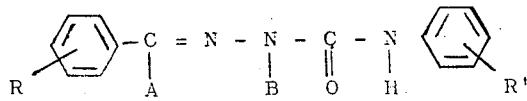

where R, R', A and B have the aforementioned meanings, however, on the understanding that if R is a hydrogen atom or a chlorine atom and A and B both are hydrogen atoms, the substituent R' is a 3,4-dichloro group or a substituent in the para position which has been selected from the group comprising an alkyl group containing from 2 to 4 carbon atoms, an alkoxy group containing from 1 to 4 carbon atoms and an amino group substituted by 1 or 2 alkyl groups which each contain from 1 to 4 carbon atoms.

The novel substances according to the invention which have a high activity can be represented by the formula

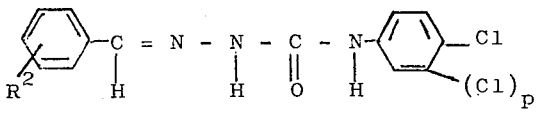

where $R^2$ and $p$ have the aforementioned meanings, however, on the understanding that when $R^2$ is a hydrogen atom or a chlorine atom $p$ is 1.

The novel substances according to the invention may be prepared by known methods for the synthesis of similar substances or by related methods.

The novel compounds according to the invention may be prepared by
a. reacting a compound of the formula

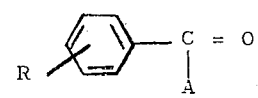

where R and A have the aforementioned meanings, with a compound of the formula

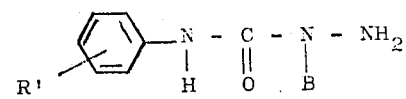

where R' and B also have the aforementioned meanings, a compound of the formula

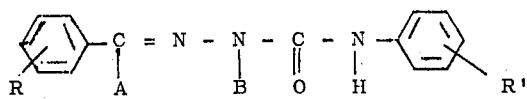

being obtained.
b. reacting a compound of the formula

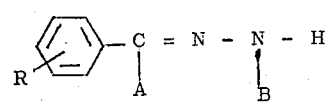

where R, A and B have the aforementioned meanings, with a compound of the formula

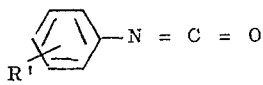

where R' has the aforementioned meaning, a compound of the formula

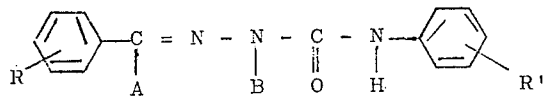

being obtained; or c. subjecting a compound of the formula

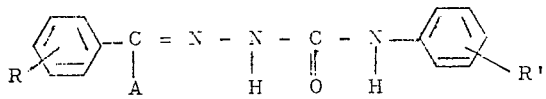

where R, A and R' have the aforementioned meanings, to an alkylation reaction, a compound of the formula

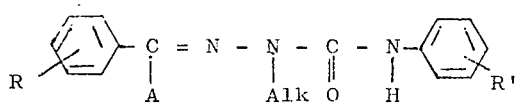

where Alk represents an alkyl group, being obtained.

With respect to the aforementioned methods (a) and (b) it should be noted that reactions of this type have been sufficiently described in the literature, for example in Archiv der Pharmazie 295 (6) 405–411 (1960) and Journal of the American Chemical Society 39, 1332 (1917). For further details we refer to these passages.

The alkylation reaction according to the aforementioned method (c) is carried out in the presence of a base, such as KOH, and a solvent, such as dimethylformamide. The reagent used is an alkylhalide, such as methyliodide.

The invention will now be described more fully with reference to the following Examples.

1. Preparation of 4-(4-methylphenyl)-1-benzylidenesemicarbazide 2.12 g of benzaldehyde and 3,3 g of 4-(4-methylphenyl)-semicarbazide were placed in 50 ml of ethanol and boiled under a reflux condenser for 45 minutes. The mixture was cooled and diluted with 50 ml of water. The resulting solid substance was filtered off and recrystallized from acetonitrile. The yield was 3.75g of 4-(4-methylphenyl)-1-benzylidene-semicarbazide having a melting point of 183°C.

2. Preparation of 4-(3,4-dichlorophenyl)-1-benzylidene-semicarbazide

A solution of 9.4 g of 3,4-dichlorophenylisocyanate in 20 ml of ether was added drop by drop to a solution of 6.0 g of benzylidenehydrazine in 100 ml of ether in 30 minutes. Immediately a white precipitate was produced. After stirring at 20°C for 30 minutes the crystals formed were drawn off and washed with ether. The yield was 12.12 g of 4-(3,4-dichlorophenyl)-1-benzylidene-semicarbazide having a melting point of 218°C.

3. Preparation of 4-(4-chlorophenyl)-2-methyl-1-benzylidene-semicarbazide 6.6 g of powdered potassiumhydroxide were suspended in 250 ml of dimethylformamide and subsequently 23.9 g of 4-(4-chlorophenyl)-1-benzylidenesemicarbazide were added to the suspension. To the resulting homogeneous solution 17.0 g of methyliodide were added drop by drop. The reaction mixture was stirred at room temperature for 30 minutes, after which the reaction product was poured into water. The precipitate formed was drawn off, washed with water and dried. After crystallization from ligroin 17.7 g of 4-(4-chlorophenyl)-2-methyl-1-benzilydenesemicarbazide having a melting point of 153°C were obtained.

The substances forming the numbers 1 to 36 of the list given hereinbefore have been prepared in a manner which corresponds to one of the reactions described in the preceding Examples.

4. Preparation of wettable powders

Wettable powders of the active substances enumerated in the preceding Examples were prepared by mixing 25 parts by weight of the active substance with 3 parts by weight of calciumligninsulfonate, 2 parts by weight of dibutylnaphthalenesulfonate and 70 parts by weight of kaolin.

5. Preparation of liquid concentrates

Liquid concentrates were prepared by dissolving 10 parts by weight of the active substance in dimethylformamide to which some cyclohexanone may have been added, after which from 6 to 7 parts by weight of an emulsifier, such as a mixture of nonylphenylpolyglycolether and alkaline earth alkylbenzenesulfonate, were added to the solution.

6. Biocidal activity against larvae of the Colorado beetle

The aforementioned active substances were dispersed in water in concentrations of 100, 30 and 10 mg of active substance per liter of aqueous dispersion. Cut stems of potato plants were sprayed to dripping with an aqueous suspension of the substance to be investigated and then placed in flasks filled with tap water. After the plants had dried, cylinders of Perspex were slipped over them. Subsequently each plant was infected with 5 larvae of Leptinotarsa decemlineata (Colorado beetle). The cylinders were covered with a gauze and stored at a temperature of 24°C and a relative humidity of between 60 percent and 70 percent.

The percentage mortality of the larvae was determined after 5 days. Each test was carried out in triplicate. The results of the tests are listed in the following Table. The meanings of the symbols used in the Table are:

+ = from 90 percent to 100 percent mortality
± = from 50 percent to 90 percent mortality
− = less than 50 percent mortality

TABLE

Biocidal activity against larvae of *Leptinotarsa decemlineata*

| Compound as numbered in the aforementioned list | Activity Concentration in the active substance in mg (per litre of test liquid) | | |
|---|---|---|---|
| | 100 | 30 | 10 |
| 1 | + | + | + |
| 2 | + | + | + |
| 3 | + | + | ± |
| 4 | + | + | + |
| 5 | + | + | ± |
| 6 | + | + | + |
| 7 | + | + | − |
| 8 | + | + | − |
| 9 | + | + | − |
| 10 | + | ± | ± |
| 11 | + | + | − |
| 12 | + | + | − |
| 13 | + | + | − |
| 14 | + | + | − |
| 15 | + | + | − |
| 16 | + | + | − |
| 17 | + | + | − |
| 18 | + | + | − |
| 19 | + | ± | − |
| 20 | ± | − | |
| 21 | ± | − | |
| 22 | + | − | |
| 23 | ± | − | |
| 24 | + | − | |
| 25 | + | ± | − |
| 26 | + | − | |
| 27 | + | − | |
| 28 | + | ± | − |
| 29 | ± | − | |
| 30 | + | − | |
| 31 | ± | − | |
| 32 | + | − | |
| 33 | ± | − | |
| 34 | + | − | |
| 35 | + | − | |

What is claimed is:

1. A method of combatting insects and larvae of insects comprising treating said insects and larvae with an insecticidally effective amount of a semicarbazide of the formula

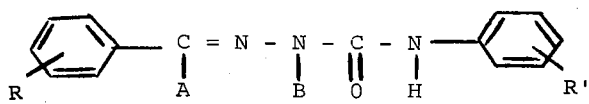

wherein R is a moiety selected from the group consisting of 3,4-dichloro and para-positioned substituents selected from the group consisting of hydrogen, chlorine, alkyl of 1 to 4 carbon atoms, alkoxy of 1 to 4 carbons, and amino substituted with 1 to 2 alkyls of 1 to 4 carbons each, A is a member selected from the group consisting of hydrogen, cyclopropyl, alkyl of 1 to 4 carbons, phenyl substituted alkyl of 1 to 4 carbons and halogen substituted alkyl of 1 to 4 carbons, B is a moiety selected from the group consisting of hydrogen and methyl, and R' is a moiety selected from the group consisting of 3,4 dichloro and para-positioned substituents selected from the group consisting of chlorine, alkyl of 1 to 4 carbons, alkoxy of 1 to 4 carbons, and amino containing 1 to 2 alkyls of 1 to 4 carbons each.

2. A method of claim 1 wherein R is a moiety selected from the group consisting of hydrogen, p-chloro, p-alkyl of 1 to 4 carbons and 3,4-dichloro, A is hydrogen, B is hydrogen, and R' is a moiety selected from the group consisting of p-chloro and 3,4-dichloro.

3. A method of claim 1 wherein the semicarbazide is 4-(4-chlorophenyl)-1-(4-chlorobenzylidene)-semicarbazide.

4. A method of claim 1 wherein the semicarbazide is 4-(4-chlorophenyl)-1-benzylidene-semicarbazide.

5. A method of claim 1 wherein the semicarbazide is 4-(4-chlorophenyl)-1-(3,4-dichlorobenzylidene)-semicarbazide.

6. A method of claim 1 wherein the semicarbazide is 4-(4-ethylphenyl)-1-(4-chlorobenzylidene)-semicarbazide.

7. A method of claim 1 wherein the semicarbazide is 4-(4-isopropylphenyl)-1-(4-chlorobenzylidene)-semicarbazide.

8. A method of claim 1 wherein the semicarbazide is 4-(4-isopropoxyphenyl)-1-(4-chlorobenzylidene)-semicarbazide.

9. A method of claim 1 wherein the semicarbazide is 4-(3,4-dichlorophenyl)-2-methyl-1-(α-cyclopropyl-4-chlorobenzylidene)-semicarbazide.

10. The method of claim 1 wherein the insects are beetles.

* * * * *